INVENTORS
WALTER W. FICKER
THOMAS J. RAJAC
ALFRED A. STRICKER

BY Wolmar J Stoffel
ATTORNEY

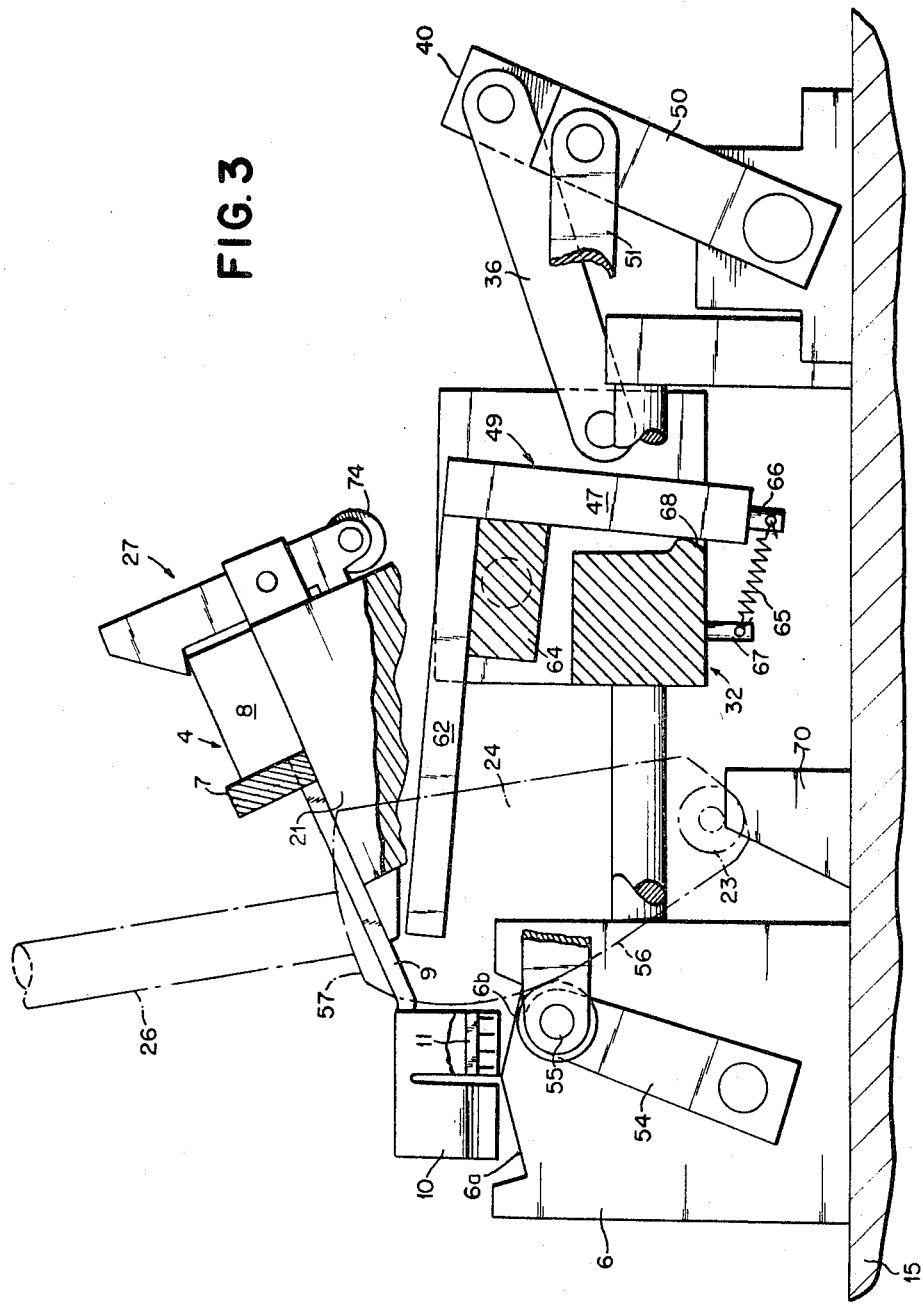

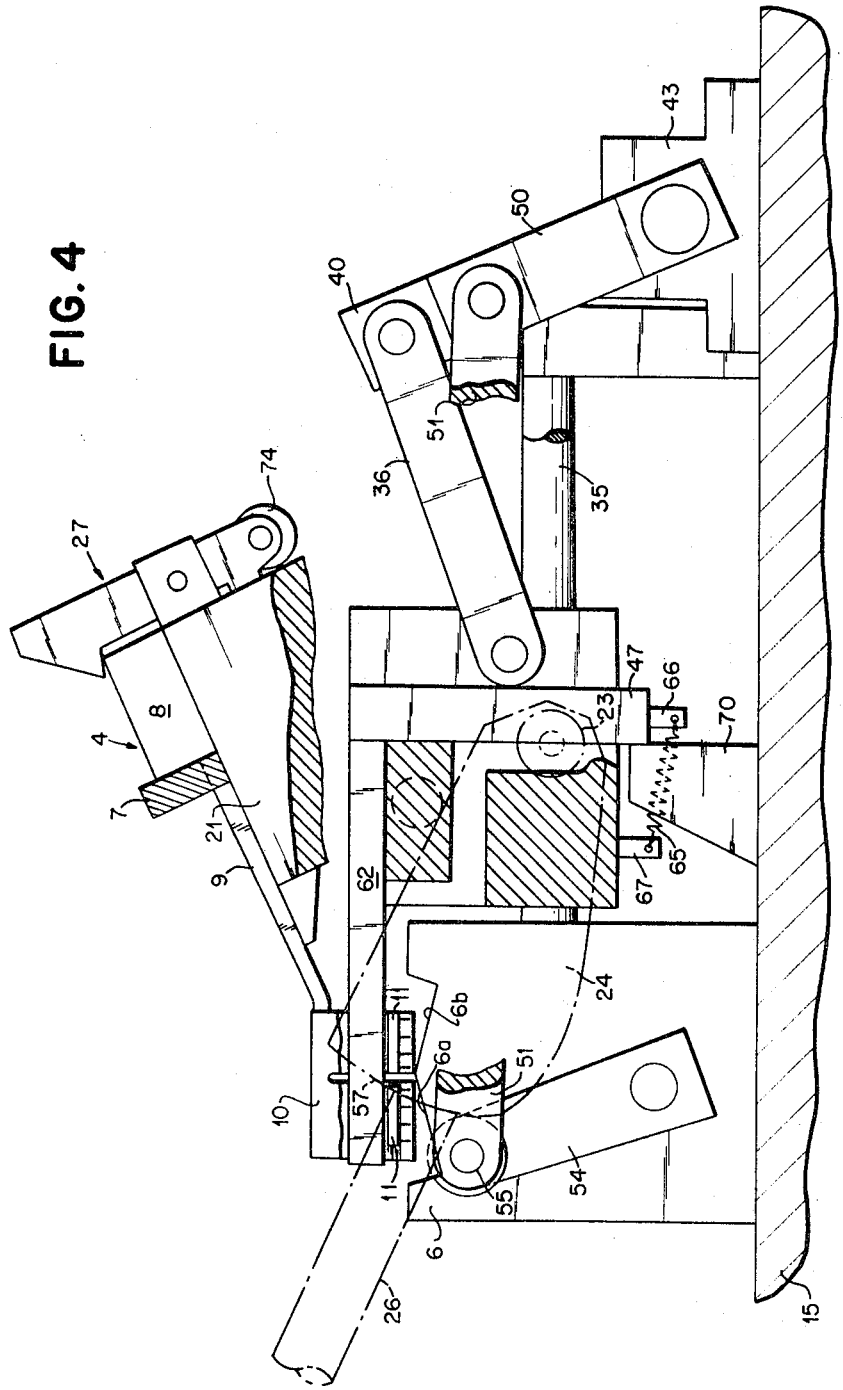

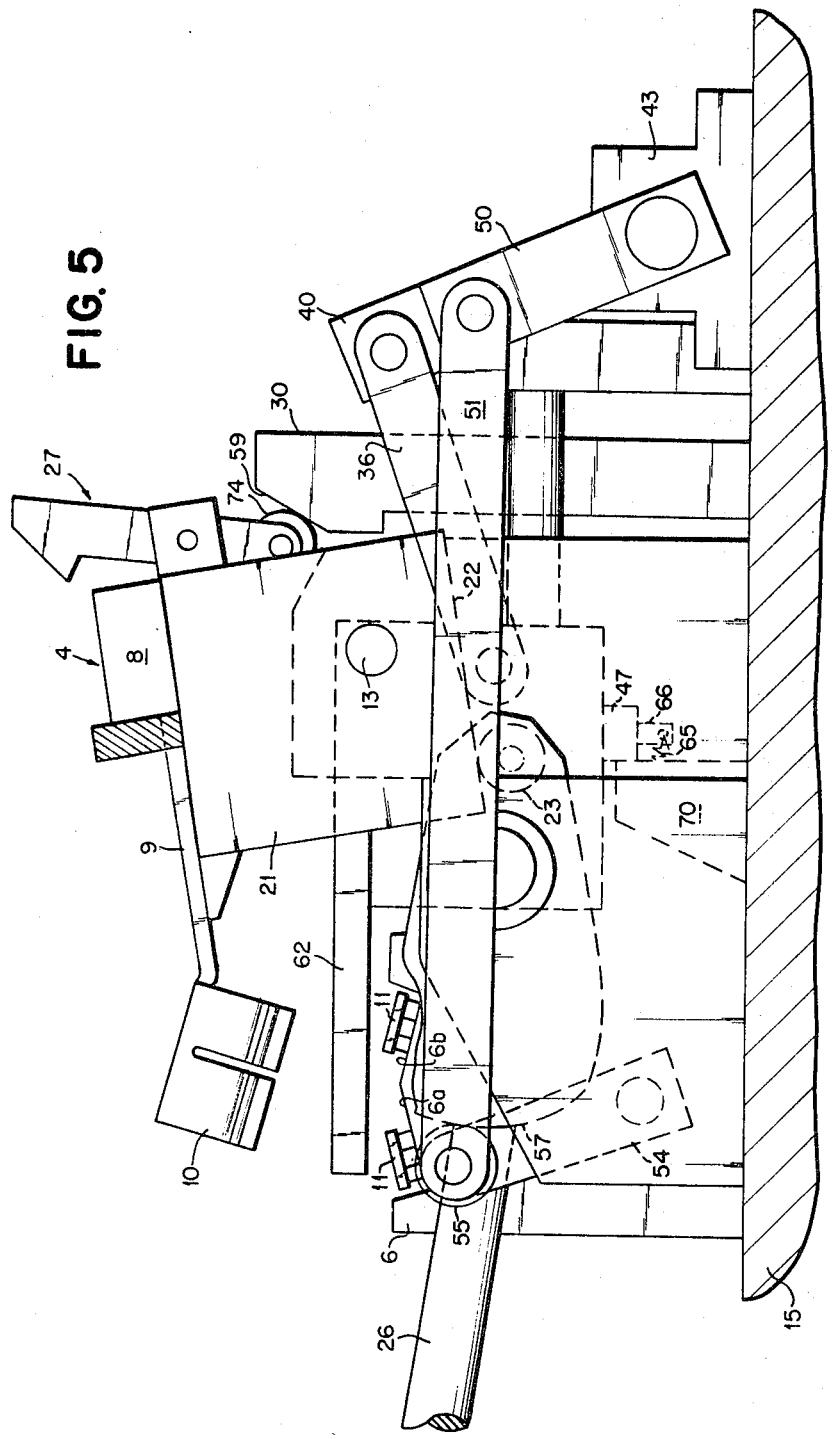

a cycle of operation.

United States Patent Office 3,443,707
Patented May 13, 1969

3,443,707
WORKPIECE RACK UNLOADER APPARATUS
Walter W. Ficker, Fishkill, and Thomas J. Rajac and Alfred A. Stricker, Wappingers Falls, N.Y., assignors to International Business Machines Corporation, Armonk, N.Y., a corporation of New York
Filed July 14, 1967, Ser. No. 653,383
Int. Cl. B65b *21/02, 69/00;* B65g *65/04*
U.S. Cl. 214—310                10 Claims

ABSTRACT OF THE DISCLOSURE

The article handling apparatus is for removing workpieces from a rack or other carrier unit that frictionally engages the workpieces. The apparatus has a support for the rack or carrier, workpiece ejector to engage workpieces in a rack, a means to provide relative movement between the workpiece ejector and the rack support to thereby eject the workpieces from the rack, and a slide to receive the workpieces.

BACKGROUND OF THE INVENTION

Field of the invention

The invention relates to article handling, more specifically to the removal of workpieces from carriers or racks used during various stages of manufacture, still more specifically to the orderly removal of electronic module components from racks in which the components are securely held between spring biased elements of a rack or similar container. An example of such a rack is the rack used to grip and hold modules as they are passed through cleaning and tinning operations in an automated manufacturing production line.

Description of the prior art

Automated mass production lines are becoming increasingly more complex in order to carry out the more technical processes being developed and utilized. The manufacturing techniques and apparatus are constantly being improved to achieve more efficient use of manpower, time, and produce better products at a lower cost to meet competition. This change in technology and apparatus is very noticeable in manufacturing lines which produce small and relatively complex products, and in particular the electronic industry.

In the electronic industry, and also many other industries, the elements being manufactured are frequently handled and conveyed in racks or trays which hold a large number of elements. Some operations can be performed on the elements as they are located on the trays, etc., while others require that they be removed and precessed individually. Other operations require the transfer of elements to specialized racks. An example of such an operation is the tinning of conductive lands on electronic modules. The module substrate can consist of a relatively small square or rectangular planar element of ceramic or other stable non-conductive material having a printed circuit that requires a coating of tin. The tinning operation consists basically of dipping the substrate in flux, molten tin, and suitable cleaners. In such operations, special racks that firmly grip the substrates are required.

The loading and unloading of trays and racks is frequently done manually. This operation is time consuming, tedious, and relatively expensive. Further, the probability of human error resulting in poor product yield is relatively high since the orientation of the elements must ordinarily be maintained in the loading and unloading operations. In the case of tinning operations, the racks used to hold modules are hot making the operation increasingly difficult. The insertion and removal of substrates from a hot rack in which the substrates must be inserted and removed with sufficient force to spread gripping elements having sufficient pressure to hold the elements is difficult and can result in significant amounts of product breakage. Also, when the operation is done manually, the orientation of the substrates must be maintained. Removal of substrates frequently requires the application of a significant degree of force that when the substrate is broken loose it bounces and becomes unorientated. Loading into a subsequent tray then requires reorientation.

SUMMARY OF THE INVENTION

It is an object of this invention to provide a new apparatus adapted to remove workpieces from a rack or other retaining means while maintaining the initial workpiece orientation.

It is another object of this invention to provide a new apparatus adapted to gently remove workpieces from a rack or other retaining means in which the workpieces are firmly gripped by portions of the rack.

Yet another object of this invention is to provide a new apparatus adapted to remove workpieces held in two or more rows in a rack or other retaining means and combine the two rows into a single row while maintaining the initial workpiece orientation.

The apparatus of the invention for removing from a rack workpieces individually supported on opposed surfaces by inwardly biased gripping elements of the rack has a workpiece slide having at least one laterally inclined bottom surface. A support is provided to hold a rack containing workpieces over the slide. A workpiece ejection means having at least one protruding element is movable to a position directly over the workpiece supported in a rack. A means is also provided to move the support for the rack to thereby place the workpiece in a rack into engagement with the protruding element of the workpiece ejection to thereby force same from the rack. The ejected workpieces are then moved from the slide by a suitable pusher element.

BRIEF DESCRIPTION OF THE DRAWING

The foregoing and other objects, features, and advantages of the invention will be apparent from the following more particular description of the preferred embodiments of the invention as illustrated in the accompanying drawing In the drawing:

FIGURE 1a is a detailed view in enlarged scale illustrating a preferred specific embodiment of a gate structure used to combine two rows of workpieces into a single row.

FIGURE 3 is a side view in partially broken section illustrating the position of the various elements of the apparatus and the module rack during the initial phase of a cycle of operation.

FIGURE 4 is a side view in partially broken section similar to FIGURE 3 illustrating the relationship of the various elements at an intermediate stage in the cycle of operation.

FIGURE 5 is a side view in partially broken section illustrating the relationship of elements during the final stage of a cycle of operation.

DESCRIPTION OF THE PREFERRED EMBODIMENT

Figure 1:
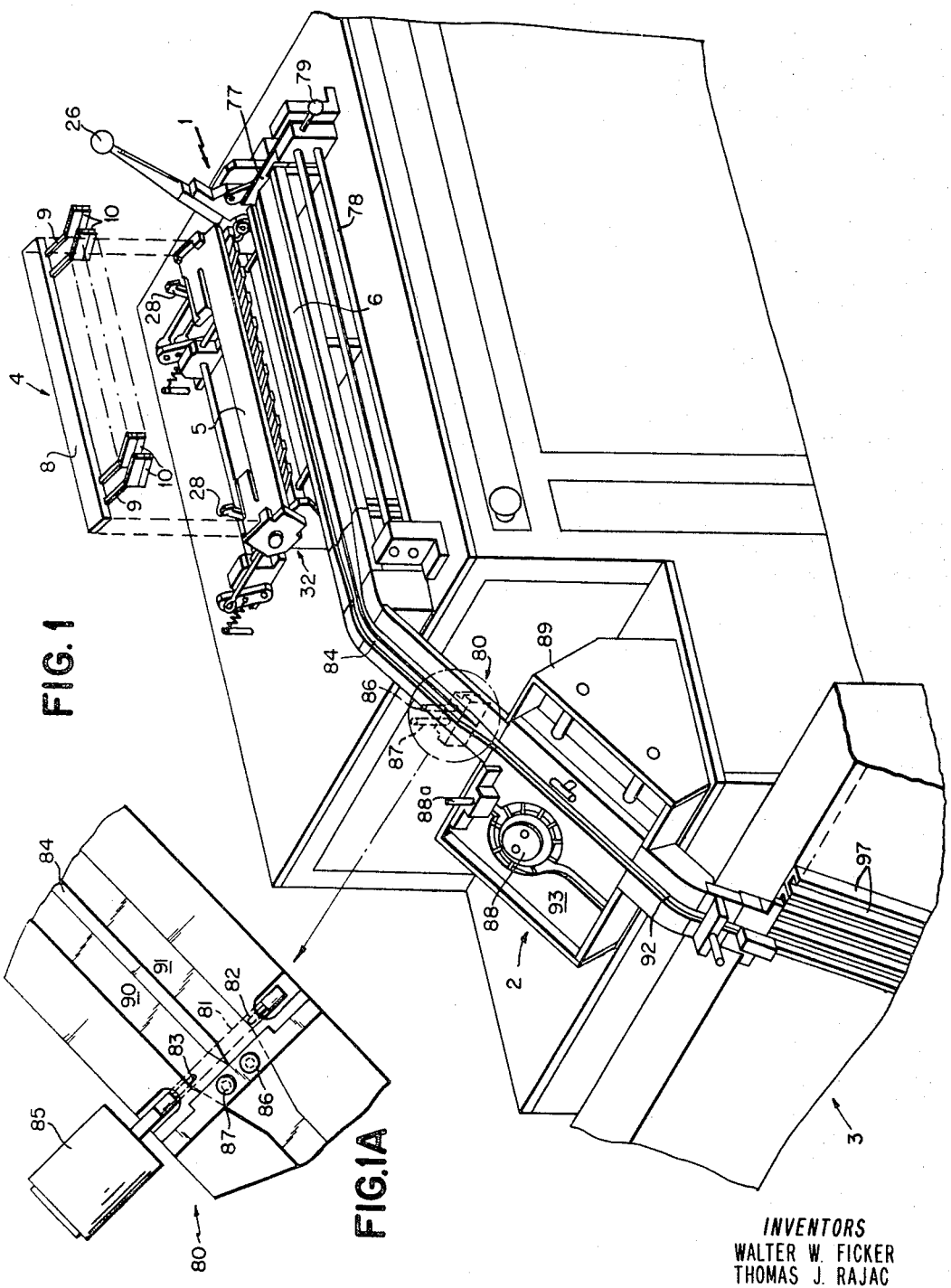
FIGURE 1 is a pictorial view illustrating a preferred specific embodiment of the unloader apparatus of the invention associated with complementary workpiece handling apparatus.

Referring now to the drawings, there is shown in FIGURE 1 a preferred specific embodiment of the unloader apparatus of the invention for removing pinned electronic modules 11 from tinner racks 4. Associated with the unloader apparatus 1 is a orientor assembly 2 adapted to either preserve the orientation of the modules as they leave the unloader 1, or impart at 90° angular reorientation. Tray loader 3 is located to receive the modules from orientor 2. Loader 3 automatically and sequentially aligns the channels of tray 97 with discharge track 92 so that modules can be loaded.

Figure 2:
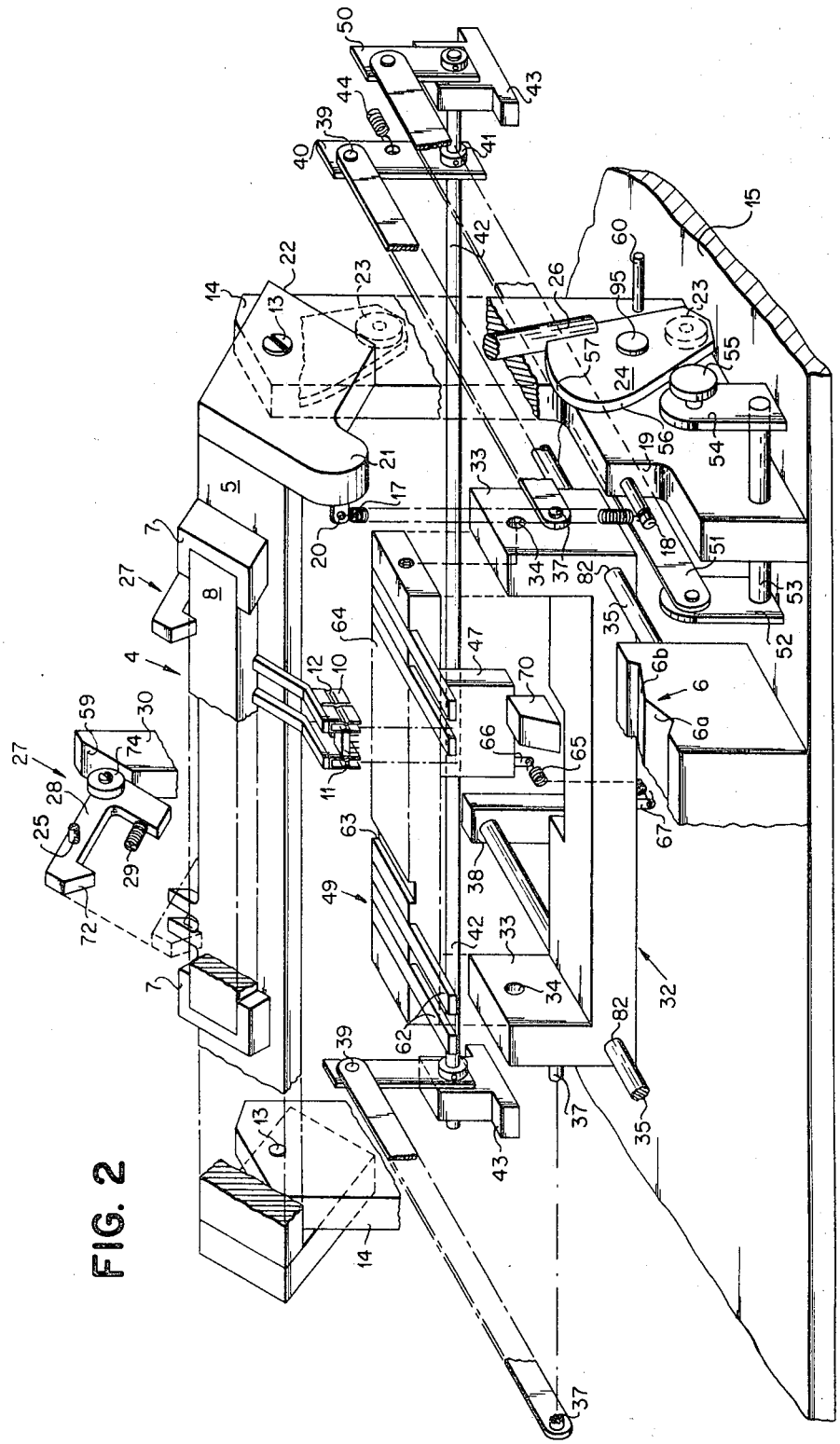
FIGURE 2 is a pictorial view in exploded relation in partially broken section illustrating a preferred specific embodiment of the unloader apparatus of the invention and more clearly illustrates the mode of operation.

Unloader 1 is adapted to remove pinned electronic modules from tinner rack 4. As more clearly illustrated in FIGURE 2, rack 4 consists of a cross bar 8 having a plurality of parallel closely spaced transversely extending shafts 9. Each of the shafts 9 has a pair of resilient leaf spring clips 10. Clips 10 hold two rows of pinned modules 11, as shown in FIGURE 4. In rack 4 modules are firmly clamped by opposing clips 10 mounted on adjacent shafts 9. Abutment ridges 12 on clips 10 retain the modules in a substantially horizontal plane.

In a tinning operation, the pinned modules to be tinned are loaded in two rows into racks 4 by a semiautomatic apparatus, not shown. The loaded rack 4 is then manually attached to a chained conveyor of a tinner apparatus which moves the rack 4 through a flux bath, a molten tin dip, and a cleaning bath in a timed sequence. The rack and resultant tinned modules are then removed from the chain conveyor and replaced with a rack of untinned modules. The tinned modules must then be removed from the hot rack, combined into a single row, without disturbing the orientation, and loaded into trays for further processing.

The tinner racks 4 are secured to a pivotable rack support 5 where the tinned modules 11 are pried from between the clamping clips 10 by ejector fingers 62. This mechanism and mode of operation will be explained in detail in the latter part of the specification. The two rows of the modules 11 upon being pried from rack 4 fall downwardly into a bifuricated slide 6 having outwardly inclined bottom surfaces 6a and 6b. The modules slide outwardly into engagement with the outer upright walls of slide 6 forming two aligned rows. It should be noted that this alignment is achieved even though the modules may be laterally displaced in rack 4 prior to being ejected.

The rows of modules in slide 6 are then pushed longitudinally by pusher 77 into two spaced sloping tracks 90 and 91 separated by a central divider 84.

Gate shuttle assembly 80 controls the flow of modules from tracks 90 and 91 and combines them into a single row for later insertion into a tray or for feeding into another process. To control the movement of the two module rows a gate 81 provided with workpiece stops 82 and 83 allow only one row at a time to flow into the lower single track. One stop is withdrawn to allow a row of modules to feed through. Gate 81 is activated by solenoid 85 in turn controlled by a circuit responsive to photocells 86 and 87. The circuit is designed so that the gate 81 is maintained in one position as long as modules are flowing through the open gate and thereby blocking the respective photocell. As soon as the photocell in the open gate is no longer blocked, indicating that the row has been completely funnelled into the single track, the gate is shifted to open the opposite track. Thus the gate alternates to merge the two rows of modules into a single row in the lower single track. The resultant single row of modules is then passed through a module orientor assembly 2, which can either turn the modules 90° or maintain the same orientation as desired. If a no module reorientation is desired, the orientor head 93 is positioned as shown in FIGURE 1 with the straight track aligned with the shuttle gate exit track and the lower discharge track 92. If a 90° reorientation is desired, the head 93 is shifted on housing 89 aligning wheel 88 and associated track with the aforementioned shuttle gate exit track and discharge track 92. The wheel 88 is provided with radially extending fingers on the periphery thereof and is driven by a small electric motor, not shown. When modules drop from the tapered exit track to the orientor, the electric motor on signal from a photocell 88a rotates the orientor wheel 88. The fingers of the orientor wheel intercept the modules and the orientor wheel turns the modules by moving them along the periphery of a 180° track. A ball plunger in the driving connection between the motor and the wheel acts as a clutch to allow the orientor wheel to slip if a module jam occurs. The modules are then fed through discharge track 92 to a tray loader 3.

As previously mentioned, tinner rack 4 is manually positioned on swivelled rack support 5. Support 5 has side portions 21 which are pivotally mounted on frame upright 14 with pins 13. Support 5 has an upper flat surface with two spaced U-shaped abutments 7 that receive the ends of cross bars 8 of rack 4. Two spaced latch assemblies 27 each having a hook 28, are also mounted on support 5 and which lock rack 4 into position. As most clearly shown in FIGURE 2, hooks 28 are each pivoted on pin 25 and are biased into locked position by spring 29. Cam surface 72 on the end of hook 28 facilitates positioning of the rack 4. During the loading phase of the cycle, the clips 10 of rack 4 holding modules 11 are positioned directly over and slightly above bifuricated track 6, as most clearly shown in FIGURE 3. Upon completion of the module ejection from the rack, hooks 28 are released by the action of cam follower 74 engaging cam surface 59 on upright post 30 as most clearly shown in FIGURE 2. Rack support 5 is biased in the downward load position by spring 17 anchored on one end by post 20 on portion 21 and on the other end by anchor 18 in frame portion 19.

Module ejection assembly 49 has a head 64 provided with grooves 63 which receive extending ejection finger 62. As most clearly seen in FIGURES 2, 3, and 4, head 64 is pivotally mounted on upright portion 33 of ejection carriage 32, which in turn is slideably mounted on spaced rods 35 positioned in apertures 82. Head 64 is mounted on pins disposed in aligned apertures 34 in upright portions 33 of carriage 32.

Depending from head 64 is a downwardly extending lug 47. Fingers 62 are pivoted to a raise position shown in FIGURE 3 by a biasing spring 65 anchored at one end to post 66 on lug 47, and on the other end to post 67 on carriage 32. Abutment 68 limits the upward pivotal movement of fingers 62.

When the carriage 32 is moved to the left as viewed in FIGURE 3, the fingers 62 remain raised until they are over the modules 11 supported in rack 4. Just before the carriage reaches the end of travel, lug 47 strikes abutment 70 thereby pivoting the finger 62 downwardly directly over modules 11 to the position shown in FIGURE 4.

The sequence or cycle of operation is illustrated in FIGURES 3 through 5. Initially the rack support 5 is biased downwardly by spring 17 to the position shown in FIGURE 3 with the modules positioned directly above slide 6. The ejector carriage 32 is in the retracted position with the ejection fingers 62 well removed so as not to interfere with the positioning of rack 4. In the next phase of operation, the ejector carriage 32 is moved forward placing the ejector fingers 62 directly above the modules supported in rack 4. In moving forward, the fingers 62 are slightly upwardly inclined until lug 47 strikes abutment 70 thereby pivoting the head 64 and fingers downwardly over the modules. The final phase of the cycle is shown in FIGURE 5. The rack support 5 is pivoted moving the rack upwardly causing the ejector finger 62 of ejector assembly 49 to pry or force the modules 11 from between the clips 10 of rack 4. The modules are released without transferring any significant amount of inertial motion or energy to the modules, thereby causing little or no displacement or injury. As the rack support 5 completes its pivotal motion, cam followers 74 engage cam surfaces 59 causing hooks 28 to release to rack 4. The empty rack is then manually removed and a full rack replaced, and the cycle repeated.

The specific mechanism to achieve the aforementioned movement of elements of the apparatus will now be described. The actuating element is a lever 26 which is manually moved by the operator, who also handles the racks 4. Lever 26 rotates a cam element 24 about a pivot pin 95. Cam 24 has two camming surfaces namely an active cam surface 56 and a dwell cam surface 57. Cam 24 engages a cam follower 55 mounted on cam support lever 54 in turn pivotally mounted on shaft 53. Lever 52 is attached to shaft 53 and actuates link 51 which rotates shaft 42, mounted on bearing blocks 43, through lever 50. The rotation of shaft 42 moves ejection carriage 32 through links 36 and levers 40. Thus carriage 32 is moved forwardly during angular movement of lever 26 for that portion when cam follower 55 engages cam surface 56. During the angular movement of lever 26 that the cam follower 55 engages cam surface 57, the carriage 32 is not moved having completed its stroke, and is locked into advanced position.

Also mounted on cam 24 is a roller 23 which engages the lower edge 22 of side portion 21 of swivelled rack support 5 during the final angular stroke of lever 26. As shown most clearly in FIGURE 5, roller 23 engages edge 22 of side portion 21 thereby pivoting support 5 about pivot pin 13. This raises the rack 4 combing or prying the modules from between clips 10 and finally placing cam follower 74 in engagement with cam 59 to thereby pivot latch 25 and release rack 4 for removal. Roller 23 does not come into engagement during the initial movement of lever 26 but occurs generally during the portion that follower 55 engages the dwell portion of cam surface 57.

After the modules have been deposited on surfaces 6a and 6b of bifuricated slide 6, they are pushed onto the inclined track leading to the shuttle gate 80 by pusher element 77 mounted on a block slidable supported on rod 78. Handle 79 is provided for manually moving element 77.

Alternately, the various elements of the apparatus can be actuated by suitable fluid, electric, or pneumatically operated power units timed to produce the proper sequence of operations, if desired.

While the invention has been particularly shown and described with reference to a preferred embodiment thereof, it will be understood by those skilled in the art that the foregoing and other changes in form and detail can be made therein without departing from the spirit and scope of the invention.

We claim:

1. Apparaus for removing from a rack workpieces individually supported on opposed surfaces by elements of the rack comprising,
   a workpiece slide provided with two laterally and oppositely inclined bottom surfaces adapted to receive workpieces from a rack,
   a support adapted to hold a rack with workpiece positioned directly over said slide,
   a workpiece ejection means having at least one protruding element,
   a means to activate said workpiece ejector to thereby position said protruding element over at least one workpiece held in a rack when supported by said support for said rack,
   a means to provide relative movement between said support for said rack and said protruding element of said workpiece ejection means to thereby place the workpiece in said rack in engagement with said protruding element of said workpiece ejection and force same from said rack, and
   a means for moving the ejected workpiece from said slide.

2. The apparatus of claim 1 wherein,
   said opposed inclined surfaces of said slide each lead into a workpiece track,
   said tracks merging into a single track, and
   a gate means is provided to control the flow of workpieces into said single track.

3. The apparatus of claim 1 wherein said workpiece ejector has a plurality of parallel protruding elements.

4. The apparatus of claim 3 wherein said means to activate said workpiece ejector includes a first means to position said protruding elements over the workpieces, and
   a second means to move the protruding elements vertically into close proximity to the workpieces held in the rack.

5. The apparatus of claim 3 wherein said workpiece ejector means includes;
   a horizontally slidable carriage,
   a head pivotally mounted on said carriage about a horizontal axis transverse to the direction of movement of said carriage, said head having mounted thereon a plurality of said protruding elements,
   a means to advance and retract said carriage,
   a means to maintain said head in a position to elevate said protruding elements during the initial portion of the advancing movement of said carriage, and
   a means to depress said protruding elements in close proximity to workpieces held in the rack during the final advancing movement of said carriage.

6. The apparatus of claim 5 wherein said support adapted to hold a rack includes,
   an elongated support,
   pivot means for said elongated support providing limited pivotal movement about a horizontal axis parallel to the longitudinal axis of said slide,
   clamping means for releasably securing a rack for workpieces on said elongated support,
   actuating means for pivoting said elongated support in timed relation with movement of said carriage which pivots said support on completion of the advancing movement of said carriage, and
   said actuating means adapted to pry said workpieces from said rack by pivoting said rack and workpieces therein into engagement with said protruding elements of said ejection means.

7. The apparatus of claim 6 wherein further including;
   an actuating means for said clamping means adapted to release said clamping means upon completion of the pivotal movement of said rack support means to permit removal of an unloaded rack.

8. The apparatus of claim 2 wherein said means to move said support for said rack comprises;
   an elongated support pivoted about an axis parallel to the longitudinal axis of said slide, and
   a means for releasably holding the rack on said support.

9. In combination, a rack for workpieces and an apparatus for removing workpieces from the rack,
   said rack comprising,
   a transverse support, a plurality of spaced members depending from said support, elements on opposed faces of said spaced members to frictionally engage workpieces,
   said unloader apparatus comprising,
   a workpiece slide,
   a support adapted to hold said rack with workpieces positioned directly over said slide,
   a workpiece ejection means including at least one protruding element,
   a means to position said protruding element over a workpiece held in a rack when supported by said support for said rack, and
   a means to move said support for said rack and said rack to thereby place said workpiece in said rack in engagement with said protruding element and force said workpiece from said rack, and means for moving the ejected workpiece from said slide.

10. The combination apparatus of claim 9 wherein said workpiece slide is provided with two laterally and oppositely inclined bottom surfaces and said rack is adapted to hold two rows of workpieces between said elements.

References Cited

UNITED STATES PATENTS 2,962,178  11/1960  Exline _____ 214—310
3,180,505  4/1965  Maurer _____ 214—310

HUGO O. SCHULZ, *Primary Examiner.*